United States Patent
Lancaster et al.

(10) Patent No.: US 8,209,566 B2
(45) Date of Patent: Jun. 26, 2012

(54) SYSTEMS AND METHODS FOR RECONFIGURING INPUT DEVICES

(75) Inventors: Jeff Lancaster, Plymouth, MN (US); Robert E. De Mers, Nowthen, MN (US)

(73) Assignee: Honeywell International Inc., Morristown, NJ (US)

( * ) Notice: Subject to any disclaimer, the term of this patent is extended or adjusted under 35 U.S.C. 154(b) by 165 days.

(21) Appl. No.: 12/363,174

(22) Filed: Jan. 30, 2009

(65) Prior Publication Data

US 2010/0199124 A1  Aug. 5, 2010

(51) Int. Cl.
*G06F 11/00* (2006.01)

(52) U.S. Cl. .................. 714/44; 714/2; 714/3

(58) Field of Classification Search .......... 714/44, 714/2, 3
See application file for complete search history.

(56) References Cited

U.S. PATENT DOCUMENTS

| | | | |
|---|---|---|---|
| 5,451,053 A | 9/1995 | Garrido | |
| 5,610,631 A | 3/1997 | Bouton et al. | |
| 5,841,425 A | 11/1998 | Zenz, Sr. | |
| 6,071,194 A | 6/2000 | Sanderson et al. | |
| 6,072,471 A | 6/2000 | Lo | |
| 6,359,572 B1 | 3/2002 | Vale | |
| 6,538,636 B1 | 3/2003 | Harrison | |
| 6,550,562 B2 | 4/2003 | Brandt et al. | |
| 6,903,662 B2 | 6/2005 | Rix et al. | |
| 6,961,048 B2 | 11/2005 | Mitchell | |
| 7,006,074 B2 | 2/2006 | Chesters | |
| 7,109,972 B2 | 9/2006 | Fu | |
| 2002/0184410 A1* | 12/2002 | Apel et al. .................. 710/5 |
| 2007/0164168 A1* | 7/2007 | Hirvonen et al. .......... 244/223 |
| 2008/0136783 A1 | 6/2008 | Pedrazzoli | |
| 2008/0153566 A1* | 6/2008 | Kovacic et al. ............ 463/16 |
| 2008/0237402 A1 | 10/2008 | Ausman et al. | |
| 2009/0164836 A1* | 6/2009 | Carmichael ................ 714/6 |
| 2010/0016077 A1* | 1/2010 | Longdale .................. 463/37 |

* cited by examiner

*Primary Examiner* — Scott Baderman
*Assistant Examiner* — Sarai Butler
(74) *Attorney, Agent, or Firm* — Ingrassia Fisher & Lorenz, P.C.

(57) ABSTRACT

A system includes an input device having first and second input members configured to be activated by a user. The input device is configured to generate activation signals associated with activation of the first and second input members, and each of the first and second input members are associated with an input function. A processor is coupled to the input device and configured to receive the activation signals. A memory coupled to the processor, and includes a reconfiguration module configured to store the input functions assigned to the first and second input members and, upon execution of the processor, to reconfigure the input functions assigned to the input members when the first input member is inoperable.

20 Claims, 10 Drawing Sheets

SYSTEMS AND METHODS FOR RECONFIGURING INPUT DEVICES

STATEMENT REGARDING FEDERALLY SPONSORED RESEARCH OR DEVELOPMENT

This invention was made with Government support under the Orion program, Contract Nos. NNJ06TA25C and RH6-118204 awarded by NASA. The Government has certain rights in this invention.

TECHNICAL FIELD

The present invention generally relates to input devices, and more particularly relates to systems and methods for reconfiguring input devices.

BACKGROUND

Computers are used in an increasing number of applications to perform a variety of different functions. For example, in an aircraft, a pilot interacts with an aircraft computer to control the aircraft. The aircraft computer typically includes a display device to display information to the pilot and to provide a user interface. An input device typically is also coupled to the computer to allow a user to enter information, control a cursor, and select items, all of which are displayed on the display device.

Input devices often include a number of input members, including joysticks and buttons, for interfacing with the display device. However, one or more of these members may fail during operation. For example, an input device that includes three buttons and a castle switch as inputs may experience issues with one or any combination of its inputs (e.g., one button, one button and the castle switch) during operation. Such issues may lead to the inability of the pilot to perform display manipulations and/or render one or more functions of the display device or flight computer inoperable.

Accordingly, it is desirable to provide for complete operation of the computer and display device when one or more of the inputs are inoperable. In addition, it is desirable to provide a reconfigurable input device. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system includes an input device having first and second input members configured to be activated by a user. The input device is configured to generate activation signals associated with activation of the first and second input members, and each of the first and second input members are associated with an input function. A processor is coupled to the input device and configured to receive the activation signals. A memory coupled to the processor, and includes a reconfiguration module configured to store the input functions assigned to the first and second input members and, upon execution of the processor, to reconfigure the input functions assigned to the input members when the first input member is inoperable. The processor is further configured to produce display signals based on the input functions associated with the activation signals, and a display device is coupled to the processor and configured to render a visual display based on the display signals from the processor.

In accordance with another exemplary embodiment, a method for reconfiguring an input device having first and second input members, includes receiving an indication that the first input member is inoperable; automatically remapping an input function associated with the first input member such that the input function is associated with second input member; and operating a display device with the second input member.

In accordance with yet another exemplary embodiment, a system includes an input device comprising first and second input members configured to be activated by a user. The input device is configured to generate activation signals associated with activation of the first and second input members, and each of the first and second input members is associated with an input function. A processor is coupled to the input device and configured to receive the activation signals. A memory is coupled to the processor, and includes a reconfiguration module configured to store the input functions assigned to the first and second input members and, upon execution of the processor, to reconfigure the input functions assigned to the input members when the first input member is inoperable. The processor is further configured to produce actuation signals based on the input functions associated with the activation signals, and an output device is coupled to the processor and configured perform a function based on the actuation signals from the processor.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to systems and methods for reconfiguring input devices. Particularly, the systems and method include a reconfiguration module that reconfigures an input device upon the failure of one or more input members. These systems and methods are especially useful in situations in which a new input device is not immediately available, such as on an aircraft or spacecraft, and enables continued operation and complete functionality of the system 100 during partial failure.

Figure 1:
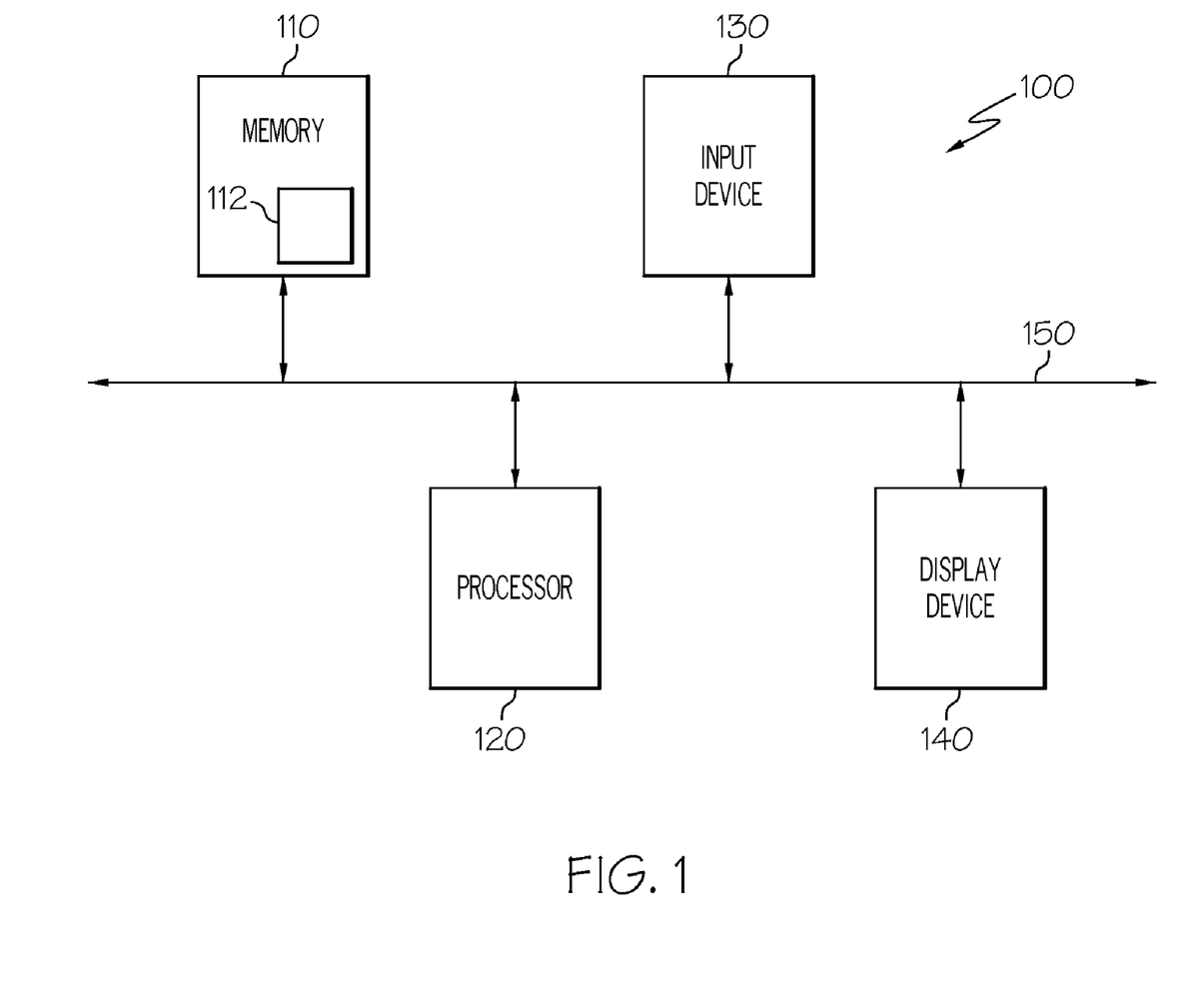
FIG. 1 is a block diagram of a system for reconfiguring an input device in accordance with an exemplary embodiment.

FIG. 1 is a block diagram of a system 100 for reconfiguring an input device 130 in accordance with an exemplary embodiment. The system 100 includes memory 110 that stores a reconfiguration module 112, a processor 120, the input device 130, and an output device such as a display device 140 coupled to one another via bus 150 (e.g., a wired and/or wireless bus).

Memory 110 may be any system, device, hardware, software, or combinations thereof capable of storing the reconfiguration module 112. That is, memory 110 may be any machine-readable medium capable of storing instructions of the reconfiguration module 112, which when executed by processor 120, will cause processor 120 to reconfigure input device 130, as discussed below. In general, reconfiguration module 112 may be any hardware and/or software set of instructions capable of reconfiguring the input device 130 in response to inputs from a user, the input device 130, and/or other components within the system 100. Moreover, processor 120 may be any system, device, hardware, software, or combinations thereof capable of executing a set of instructions such as those contained in reconfiguration module 112.

Input device 130 can be any device that enables user interaction with the system 100, including manipulation of display device 140. The input device 130 can include any number of input members, including joysticks, switches, buttons, touch pads, trackballs, and/or rotary switches. One such exemplary embodiment is discussed below with reference to FIG. 2. In general, the input device 130 may include any suitable hardware or software for converting physical manipulation of the inputs into activation signals for processor 120. The processor 120 then generates display signals for the display device 140 and/or executes a function based on these signals. In addition, upon execution of reconfiguration module 112, these input members may represent different functions or display commands based on the mode of the input device 130, such as upon failure of one or more of the input members.

Display device 140 may be any device suitable for displaying information to the user based on signals from the processor 120 and that allows the user to interface with system 100 via input device 130. For example, the display device can be a cathode ray tube (CRT) or liquid crystal display (LCD). One such exemplary embodiment is discussed below with reference to FIG. 3. Although exemplary embodiments are discussed below with reference to a display device 140 as the output device, other embodiments may not include a display device 140. For example, the output device can be an actuator controlled by the input device 130, the motion of which may typically be directly perceived by the user.

Figure 2:
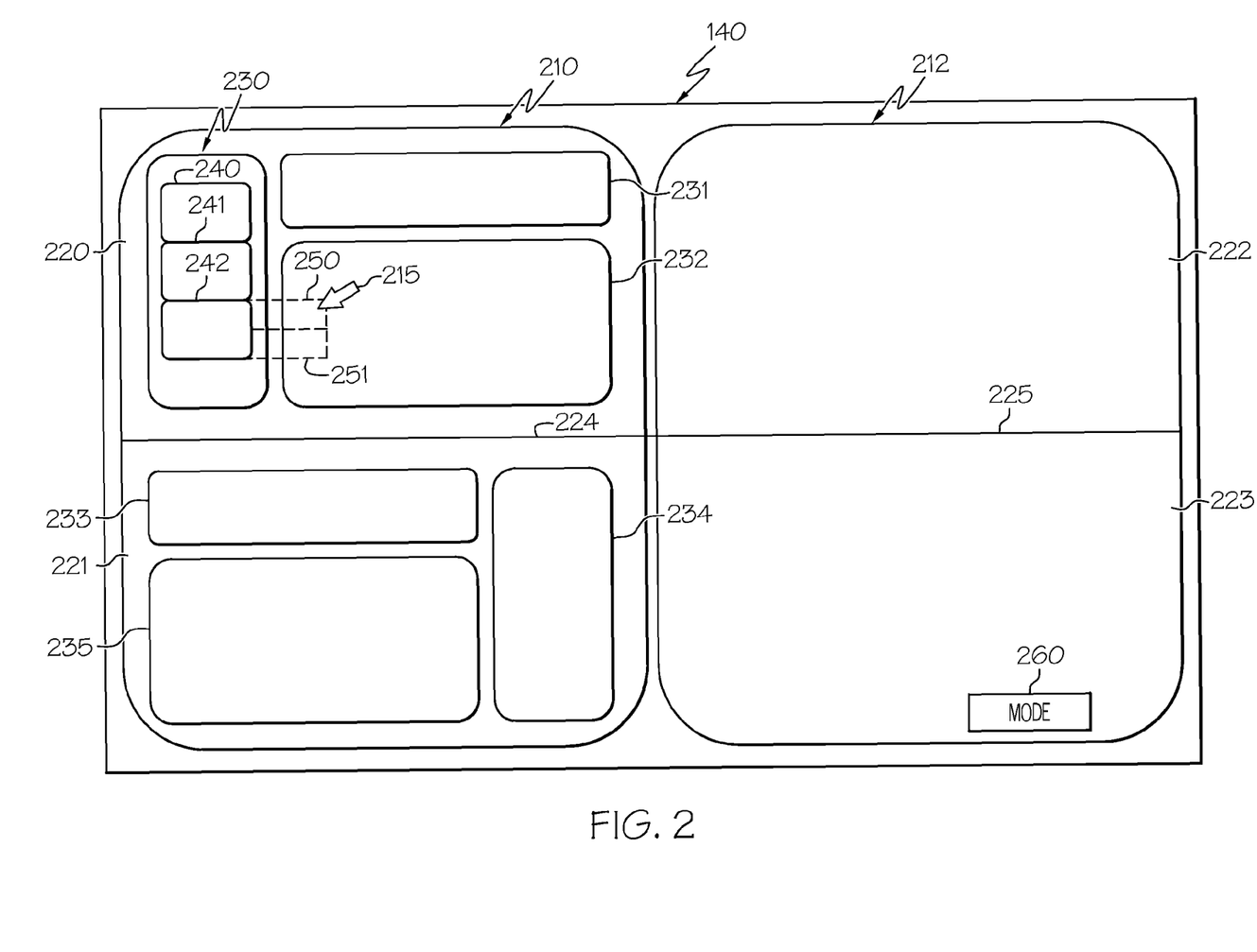
FIG. 2 is a view of a display device of the system of FIG. 1 in accordance with an exemplary embodiment.

FIG. 2 is view of a display such as display device 140 of FIG. 1 in accordance with an exemplary embodiment. In one exemplary embodiment, the display device 140 includes a first screen 210 and a second screen 212 that can be navigated by the cursor 215 controlled by input device 130. In this embodiment, the screens 210, 212 are not continuous across the display device 140. As such, a user can navigate the cursor 215 within one screen or the other, but not both, at any given time. In one embodiment, the cursor 215 is used to indicate the active area for navigation and/or execution, either with two, three, or four degrees of freedom and/or any position on the display device 140. In other embodiments, the cursor 215 is omitted and other mechanisms are used to indicate the active area, such as highlighting or enhanced borders.

The first screen 210 has a first upper region 220 and a first lower region 221 that are separated by a first midline 224. Similarly, the second screen 212 has a second upper region 222 and a second lower region 223 that are separated by a second midline 225. The regions 210-223 may restrict a cursor to limit selection options, and thus, to make the display device 140 easier for the user to navigate.

Within each region 220-223, there can be one or more graphical objects or menus, such as graphical objects 230-235. For example, first, second, and third graphical objects 230-232 are arranged in upper region 220, and first, second, and third graphical objects 233-235 are arranged in lower region 221. Although not shown, upper and lower regions 222, 223 can also have graphical objects. The graphical objects 230-235 may also have menu items, such as items 240-242 in graphical object 230. When a user clicks an item, a dialog box with functional choices can appear. One such example is the dialog box from item 242 that includes functional choices 250, 251. The functional choices 250, 251 can result in the execution of a desired function, such as opening or closing an actuator or turning on or off another system. Although FIG. 2 illustrates one exemplary display, exemplary embodiments described below are applicable to any type of display. Moreover, one or more of the screens, regions, graphical objects, items, and functional choices can be omitted and/or additional features added.

An indication 260 of a current reconfiguration mode can also be displayed to the user on the display device 140. An audio alert or other indicator of the reconfiguration mode can also be presented to the user, and the event recorded in a record of the operation and activity or communicated to a monitoring system. For example, the reconfiguration mode indication 260 can indicate the failures of one or more input members of the input device 130 (FIG. 1), and/or may indicate which of the remaining input members then retains the functionality of the failed member or members.

Accordingly, an input device 130 should be able to interface with display device 140 in a number of ways, including: (1) navigating between screens, e.g., between screens 210, 212; (2) navigating between upper and lower regions, e.g., between regions 220, 221 or between regions 222, 223; (3) navigating between graphical objects, e.g., between objects 230, 231, 232 or between objects 233, 234, 235; (4) navigating between items within graphical objects, e.g., between items 240, 241, 242; (5) navigating between functional choices, e.g., between functional choices 250, 251; and (6) executing a functional choice, e.g., functional choice 250.

Figure 3:
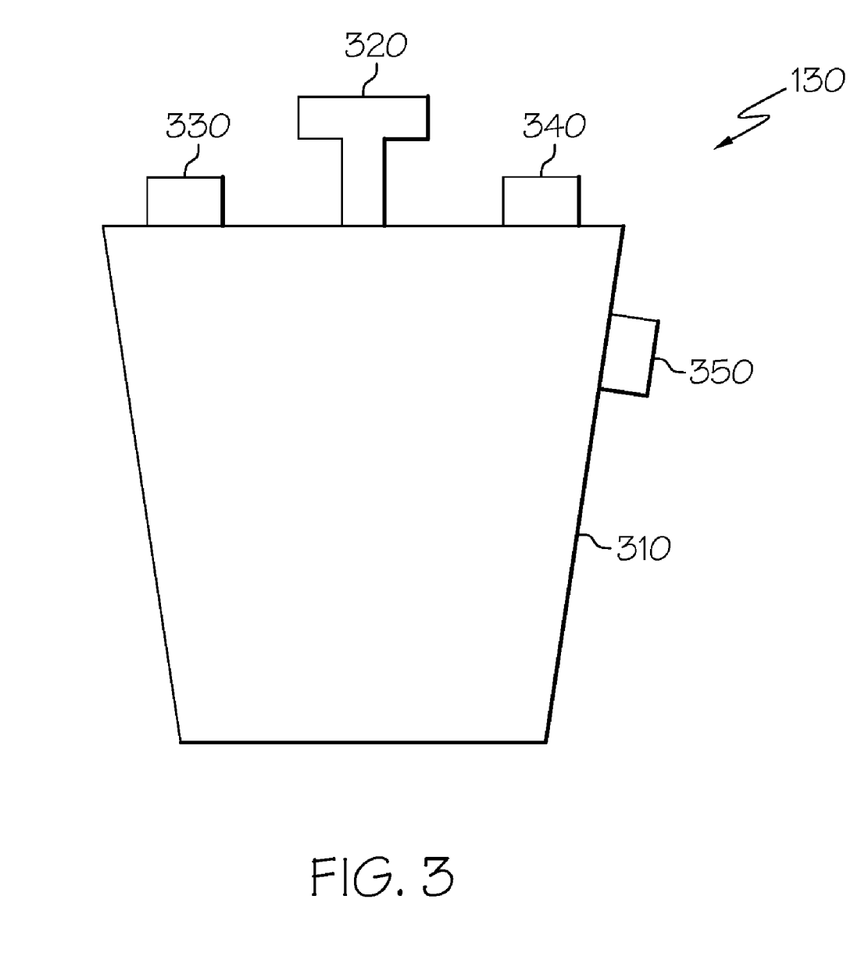
FIG. 3 is a view of an input device of the system of FIG. 1 in accordance with an exemplary embodiment.

FIG. 3 is view of an input device such as input device 130 of FIG. 1 in accordance with an exemplary embodiment. The input device 130 can be used to control and interact with any type of system, including an avionic system. In one exemplary embodiment, the input device 130 is used in conjunction with a display device, such as display device 140 of FIGS. 1 and 2.

The input device 130 includes a housing 310 and a number of input members, including a castle switch 320 and three buttons 330, 340, 350. The castle switch 320 includes a four-way (i.e., up, down, left, right) joystick-type input. In general, in the view of FIG. 3, the user would grasp the input device 130 with their left hand, and manipulate the first button 330 with the middle finger, the castle switch 320 and the second button 340 with the index finger, and the third button 350 with the thumb.

Figure 4:
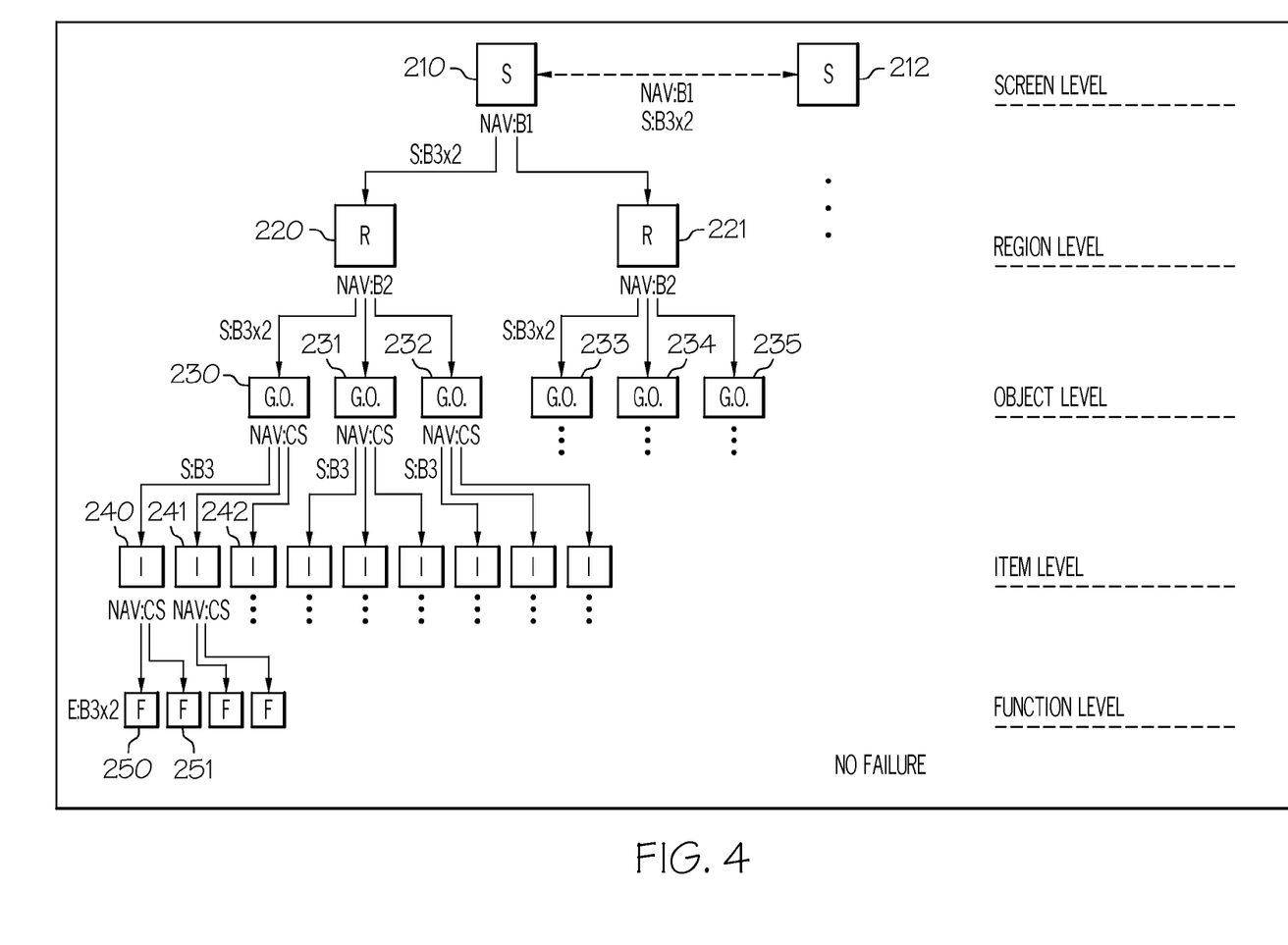
FIG. 4 is a block diagram illustrating an exemplary manipulation of an organization hierarchy of the system of FIG. 1 during a normal mode.

Navigation and interface functionality between the input device 130 and the display device 140 will now be described in accordance with an exemplary embodiment. FIG. 4 is a block diagram of the operational hierarchy associated with the display device 140 shown in FIG. 2, and is used to more clearly describe the interaction between the input device 130 and the display device 140 in a normal operation mode. More specifically, the operational hierarchy of FIG. 4 illustrates the screens, regions, objects, items, and functional choices separated into levels. As such, the description below illustrates how to navigate between screens, regions, objects, items, and functional choices within a level; how to choose screens, regions, objects, and items to move between levels; and how to execute a functional choice. In general, the numbered items in FIG. 4 correspond to the similarly numbered items in FIG. 2. Although described below, it is noted that the navigation and selection functions for the input device 130 are shown in FIG. 4 labeled as "NAV" and "S," respectively. For example, "NAV: B1" indicates that the user sequentially navigates between selections by pressing the first button 330, and "S: B3X2" indicates that the user selects a selection by double-clicking (i.e., pressing twice) the third button 350. FIG. 4 illustrates one exemplary hierarchy, although other exemplary embodiments may have different organization.

Referring to FIGS. 3 and 4, a user initially sequentially navigates between screens 210, 212 using the first button 330, and selects a screen 210, 212 by double-clicking the third button 350. On the region level of the operational hierarchy, the user sequentially navigates between regions (e.g., between regions 220, 221) using the first button 330, and selects a region by double clicking the third button 350.

On the graphical object level of the operational hierarchy, the user sequentially navigates between graphical objects (e.g., between objects 230, 231, 232 or between objects 233, 234, 235) by pressing the second button 340 to sequentially move around the graphical objects. The user then selects a graphical object by double clicking the third button 350.

On the item level of the operational hierarchy, the user sequentially navigates between items (e.g., between items 240, 241, 242) using a left/right or up/down action of the castle switch 320, and an item is selected by clicking the third button 350. This should open up a dialog box with functional choices (e.g., functional choices 250, 251). The user may navigate between the functional choices with castle switch 320, and execute the desired functional choice by double clicking the third button 350. Upon execution of the functional choice, the operational hierarchy defaults to the item level (e.g., items 240-242). In other embodiments, the operational hierarchy defaults to the screen, region, or graphical object level. In some embodiments, including some or all of the embodiment discussed below, each of the screens, regions, graphical objects, items, and function choices may include a choice that, when executed, moves "up" a level in the operational hierarchy or otherwise cancel a current choice.

As noted above in reference to FIG. 1, the system 100 further includes a reconfiguration module 112 that is configured to sense a failure associated with the input device 130 and reconfigures the input device 130 to accommodate the failure. This condition can be referred to as a "reconfiguration mode" for the input device 130. The reconfiguration mode is activated upon detection of an input failure by the system to which it is a part (e.g., an avionic system), or when it is detected by a user and the user informs the system of input failure. The user can indicate a failure to the system 100, for example, by using a dedicated or alternate input device, such as the keyboard or the co-pilot's controls. The system 100 can automatically enter a reconfiguration mode upon detecting a failure, for example, using built-in test equipment function. In another embodiment, the system 100 detects a failure upon receipt of a continuous activation signal, i.e., a signal that indicates an input member is stuck.

In general, the reconfiguration module 112 re-maps the input capabilities of the failed input members to the other, remaining functional input members such that complete input device functionality is maintained. That is, when the backup operational mode is operative, the remaining, functional input members then possess the functionality of the failed input members. Through these reconfiguration modes, total functionality of an input device is maintained as long as at least one input remains functional. In one exemplary embodiment, the remapping is predetermined based on the failed input member. In other embodiments, the reconfiguration module 112 can make a remapping determination during operation based on, for example, the use characteristics of the input member. For example, if an input member fails, the reconfiguration module 112 can determine which input member is otherwise least used and remap the failed input member functionality to that input member.

As one example, with reference to the input device 130, the castle switch 320 and/or one or more of the buttons 330, 340, 350 can fail individually or in combination. Exemplary embodiments of the reconfiguration of the input device 130 are described below based on various reconfiguration modes.

Figure 5:
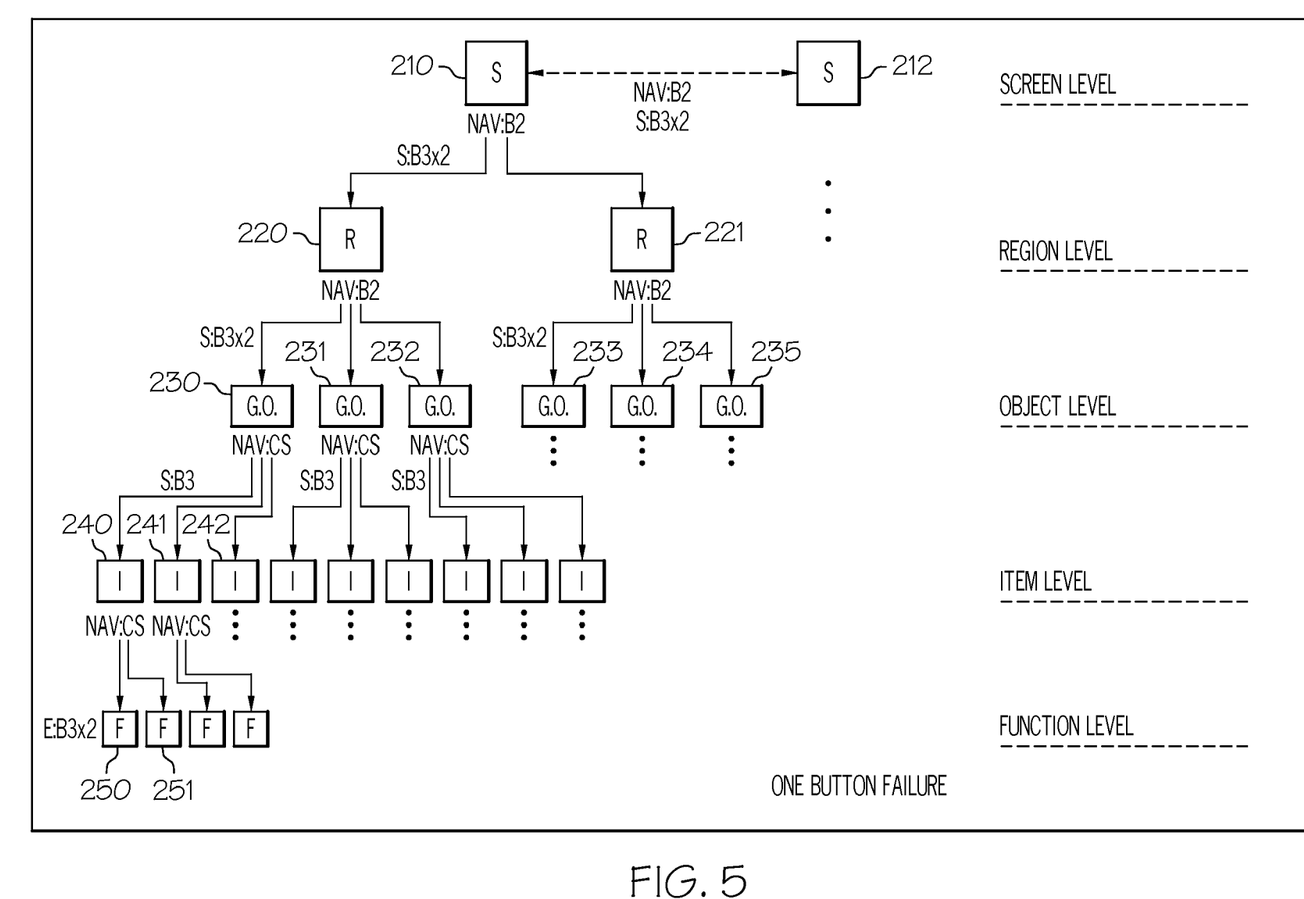
FIG. 5 is a block diagram illustrating an exemplary manipulation of an organization hierarchy of the system of FIG. 1 during a first reconfiguration mode.

FIG. 5 is a block diagram showing the operational hierarchy of the display device 140 and input device 130 during a first reconfiguration mode in which one button is inoperable. In further reconfiguration modes and other exemplary embodiments, including those discussed below and alternate embodiments thereof, other inputs and/or combination of inputs are inoperable. As in FIG. 4, numbered screens, regions, graphical objects, items, and functional choices correspond to similarly numbered screens, regions, graphical objects, items, and functional choices of FIG. 2. In this exemplary case, the first button 330 has failed, and the remaining buttons 340, 350 and castle switch 320 are operational.

A user initially sequentially navigates between screens 210, 212 using the second button 340, and selects a screen 210, 212 by double-clicking the third button 350. On the region level of the operational hierarchy, the user sequentially navigates between regions in a respective screen (e.g., between regions 220, 221) using the second button 340, and selects a region by double clicking the third button 350.

On the graphical object level of the operational hierarchy, the user sequentially navigates between graphical objects (e.g., between objects 230, 231, 232 or between objects 233, 234, 235) by pressing the second button 340 to sequentially move around the graphical objects. The user then selects a graphical object by double clicking the third button 350.

On the item level of the operational hierarchy, the user sequentially navigates between items (e.g., between items 240, 241, 242) using a left/right or up/down action of the castle switch 320, and an item is selected by clicking the third button 350. This should open up a dialog box with functional choices (e.g., functional choices 250, 251). The user may navigate between the functional choices with castle switch 320, and execute the desired functional choice by double clicking the third button 350. Upon execution of the functional choice, the operational hierarchy defaults to the item level (e.g., items 240-242). In other embodiments, the operational hierarchy defaults to the screen, region, or graphical object level. This exemplary reconfiguration is applicable to the failure of the second button 340, although exemplary embodiments may alternatively include the failure of the first button 330 or the third button 350.

Figure 6:
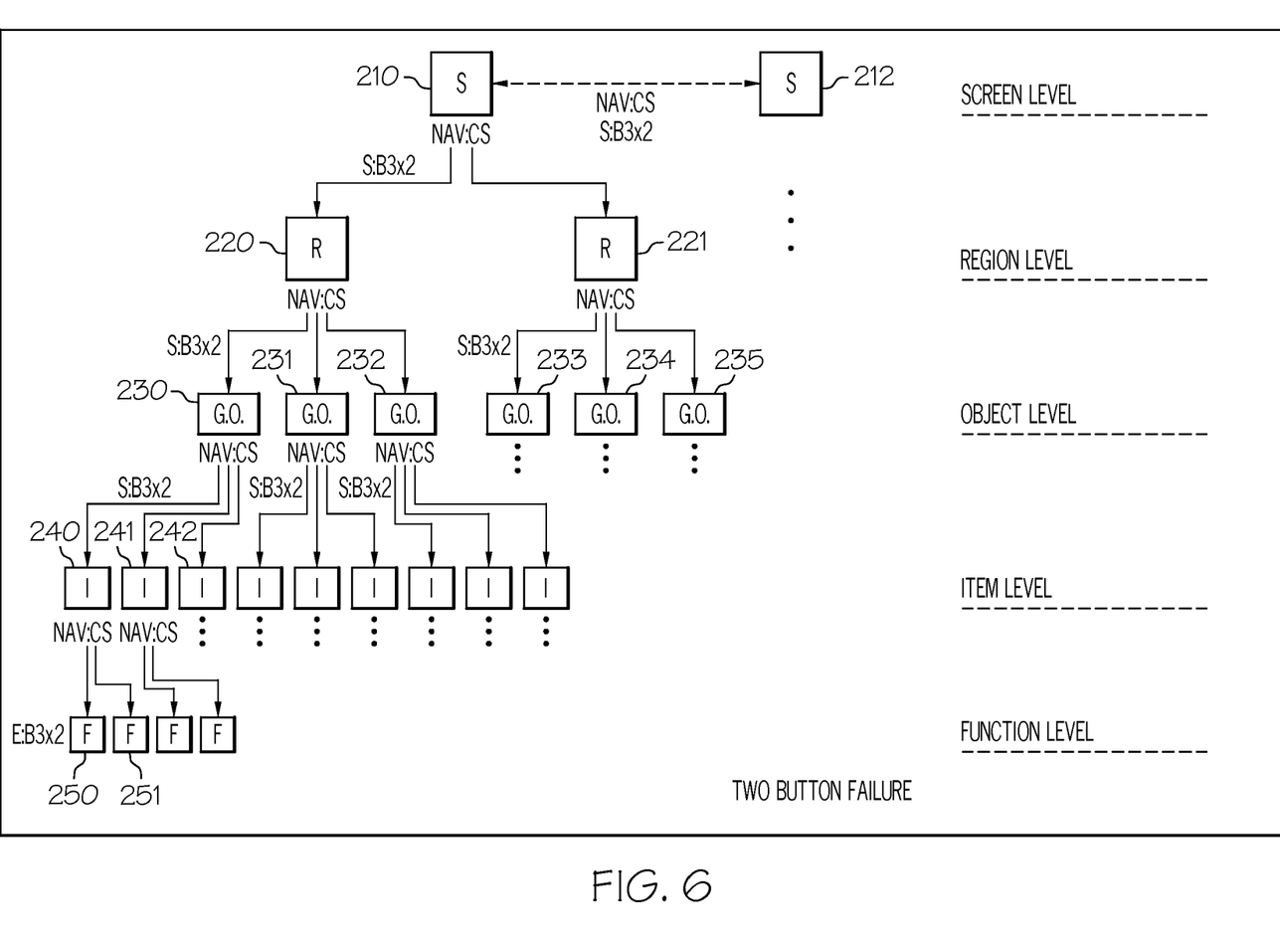
FIG. 6 is a block diagram illustrating an exemplary manipulation of an organization hierarchy of the system of FIG. 1 during a second reconfiguration mode.

FIG. 6 is a block diagram showing the operational hierarchy of the display device 140 and input device 130 during a second reconfiguration mode in which two buttons are inoperable. As in FIG. 4, numbered screens, regions, graphical objects, items, and functional choices correspond to similarly numbered screens, regions, graphical objects, items, and functional choices of FIG. 2. In this exemplary case, the first and second buttons 330, 340 have failed, and the remaining button 350 and castle switch 320 are operational.

A user initially sequentially navigates between screens 210, 212 using the castle switch 320, and selects a screen 210, 212 by double-clicking the third button 350. On the region level of the operational hierarchy, the user sequentially navigates between regions in a respective screen (e.g., between regions 220, 221) using the castle switch 320, and selects a region by double clicking the third button 350.

On the graphical object level of the operational hierarchy, the user sequentially navigates between graphical objects (e.g., between objects 230, 231, 232 or between objects 233, 234, 235) by pressing the castle switch 320 to sequentially move around the graphical objects. The user then selects a graphical object by double clicking the third button 350.

On the item level of the operational hierarchy, the user sequentially navigates between items (e.g., between items 240, 241, 242) using a left/right or up/down action of the castle switch 320, and an item is selected by clicking the third button 350. This should open up a dialog box with functional choices (e.g., functional choices 250, 251). The user may navigate between the functional choices with castle switch 320, and execute the desired functional choice by double clicking the third button 350. Upon execution of the functional choice, the operational hierarchy defaults to the item level (e.g., items 240-242). In other embodiments, the operational hierarchy defaults to the screen, region, or graphical object level. This exemplary reconfiguration is applicable to the failure of the first and second buttons 330, 340, although exemplary embodiments may alternatively include the failure of any two of the three buttons 330, 340, 350.

Figure 7:
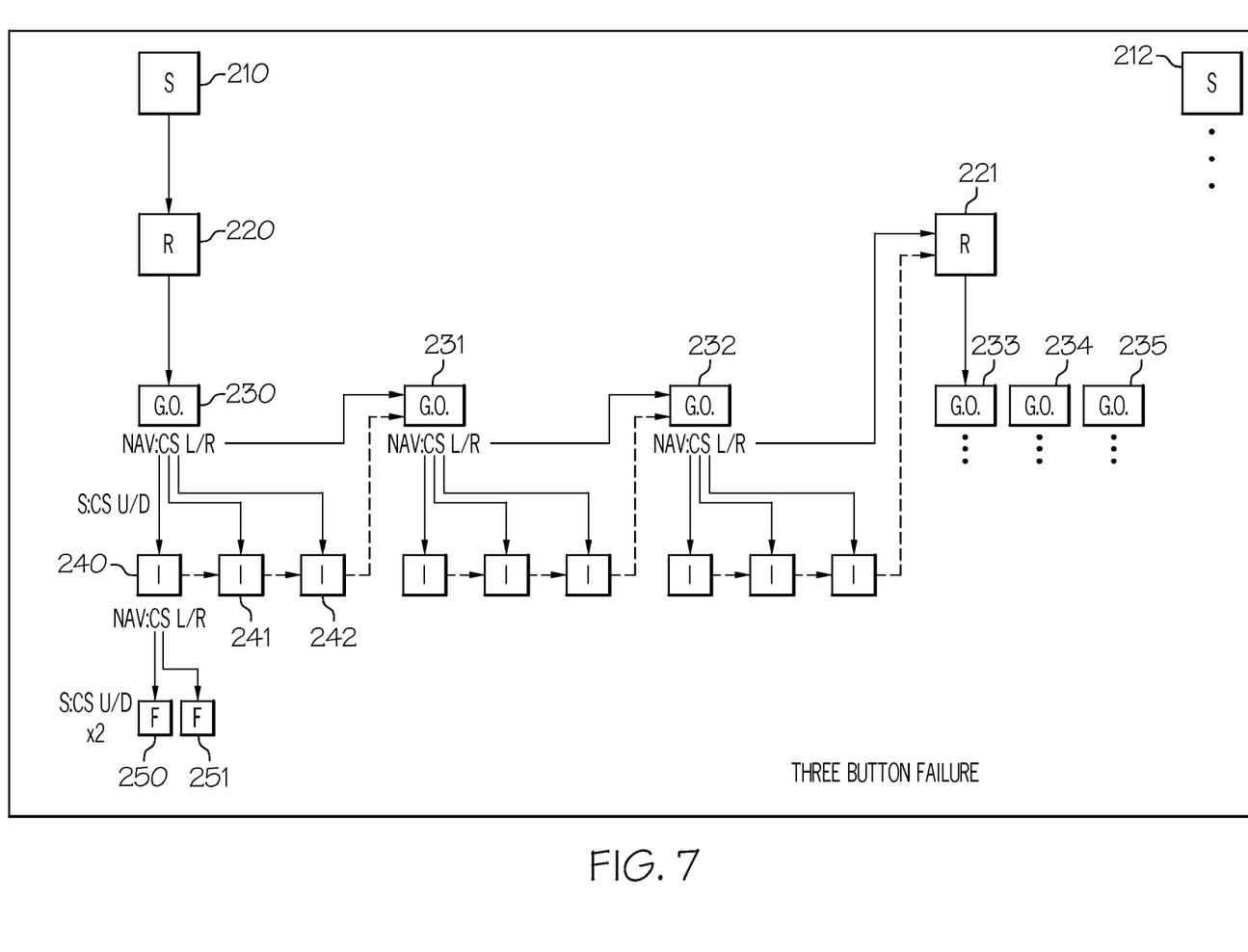
FIG. 7 is a block diagram illustrating an exemplary manipulation of an organization hierarchy of the system of FIG. 1 during a third reconfiguration mode.

FIG. 7 is a block diagram showing the operational hierarchy of the display device 140 and input device 130 during a third reconfiguration mode in which three buttons are inoperable. As in FIG. 4, numbered screens, regions, graphical objects, items, and functional choices correspond to similarly numbered screens, regions, graphical objects, items, and functional choices of FIG. 2. In this exemplary case, the first, second, and third buttons 330, 340, 350 have failed, and only the castle switch 320 is operational.

A user initially sequentially navigates with the left/right action of the castle switch 320 within first graphical object 230 of the upper region 220 of the first screen 210. The left/right action of the castle switch sequentially navigates down the items 240-242. To choose an item (e.g., item 240), the user performs an up/down action on the castle switch 320 to open up a dialog box with functional choices (e.g., functional choices 250, 251). The user sequentially navigates the functional choices with a left/right action of the castle switch 320, chooses the functional choice with an up/down action of the castle switch 320, and executes the functional choice with a double left/right action of the castle switch 320. After execution, the operational hierarchy defaults to current graphical object (e.g., graphical object 230). After navigating through all of the items within the first graphical object 230, the operational hierarchy proceeds to a subsequent graphical object, which in this case is second graphical object 231.

Within the second graphical object 231, the user sequentially navigates with a left/right action of castle switch 320 through items. To choose an item, the user performs an up/down action with castle switch 320 to open up a dialog box with functional choices. The user sequentially navigates the functional choices with a left/right action of the castle switch 320, chooses the functional choice with an up/down action of the castle switch 320, and executes the functional choice with a double left/right action of the castle switch 320. After execution, the operational hierarchy defaults to current graphical object (e.g., graphical object 231). After navigating through all of the items within the current graphical object, the operational hierarchy proceeds to a subsequent graphical object. This process is repeated until all of the graphical objects within the upper region 220 have been navigated. The operational hierarchy then proceeds to the lower region 221 of the first screen 210. The process is then repeated through the graphical objects of the lower region 221 of the first screen 210, through the graphical objects of the upper region 222 of the second screen 212, and finally, through the graphical objects of the lower region 223 of the second screen. In other embodiments, the left/right action can be replaced with the up/down action, and vice versa, depending on the relative orientation of the screens, regions, graphical objects, items, and functional choices. For example, the designated action may depend on the most intuitive approach to the user. Moreover, an up/down action can include an up action for one function and a down action for another function. Similarly, a double up/down action may include double up, double down, or any combination thereof. The left/right action described above can be similarly configured.

Figure 8:
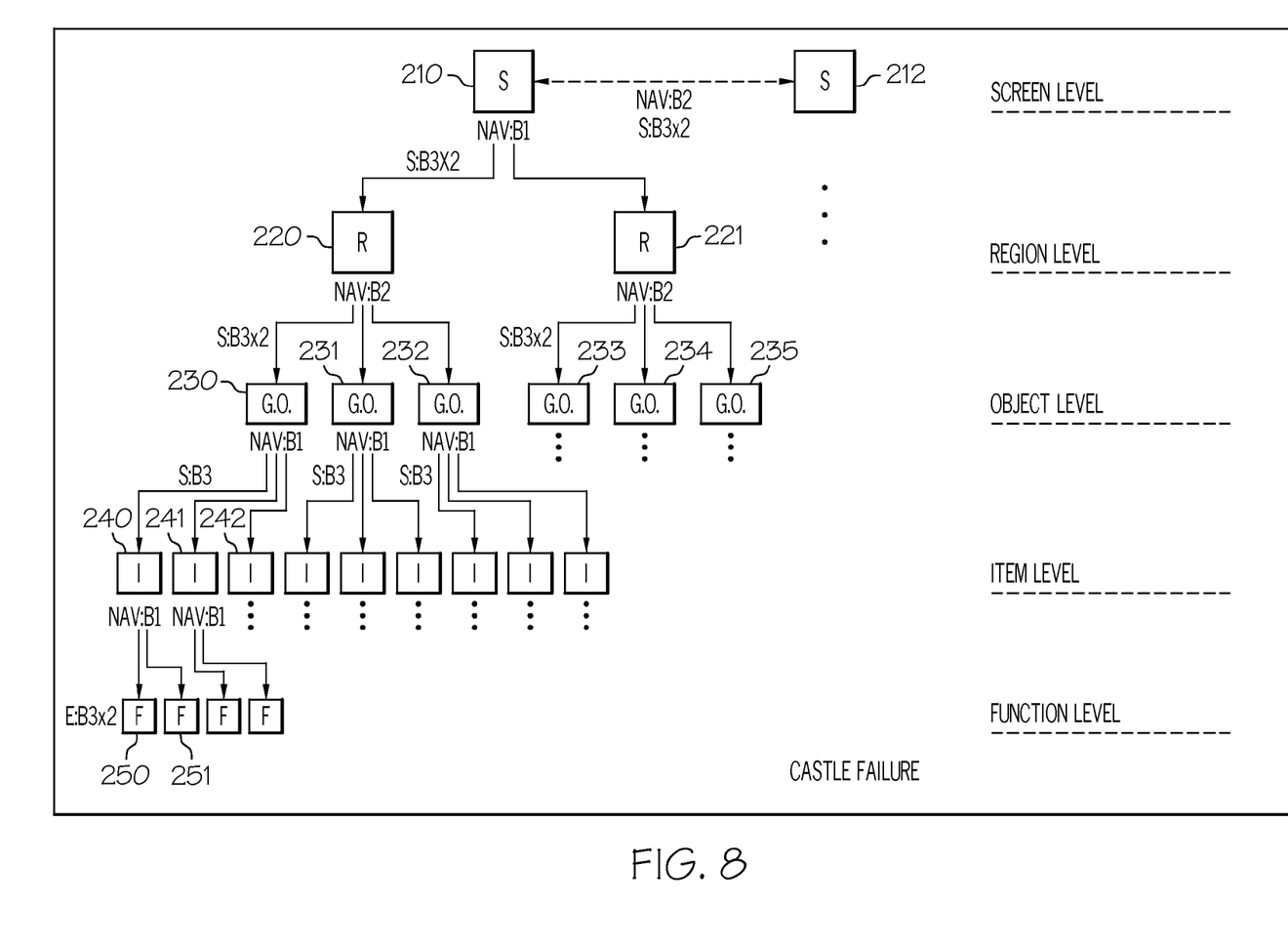
FIG. 8 is a block diagram illustrating an exemplary manipulation of an organization hierarchy of the system of FIG. 1 during a fourth reconfiguration mode.

FIG. 8 is a block diagram showing the operational hierarchy of the display device 140 and input device 130 during a fourth reconfiguration mode in which the castle switch 320 is inoperable. As in FIG. 4, numbered screens, regions, graphical objects, items, and functional choices correspond to similarly numbered screens, regions, graphical objects, items, and functional choices of FIG. 2. In this exemplary case, the castle switch 320 has failed, and the remaining first, second, and third buttons 330, 340, 350 are operational.

A user initially sequentially navigates between screens 210, 212 using the second button 340, and selects a screen 210, 212 by double-clicking the third button 350. On the region level of the operational hierarchy, the user sequentially navigates between regions (e.g., between regions 220, 221) using the second button 340, and selects a region by double clicking the third button 350.

On the graphical object level of the operational hierarchy, the user sequentially navigates between graphical objects (e.g., between objects 230, 231, 232 or between objects 233, 234, 235) by pressing the second button 340 to sequentially move around the graphical objects. The user then selects a graphical object by double clicking the third button 350.

On the item level of the operational hierarchy, the user sequentially navigates between items (e.g., between items 240, 241, 242) using the first button 330, and an item is selected by clicking the third button 350. This should open up a dialog box with functional choices (e.g., functional choices 250, 251). The user may navigate between the functional choices with the first button 330, and execute the desired functional choice by double-clicking the third button 350. Upon execution of the functional choice, the operational hierarchy defaults to the item level (e.g., items 240-242). In other embodiments, the operational hierarchy defaults to the screen, region, or graphical object level. In corresponding exemplary embodiments, the second or third buttons 340, 350 have alternately failed.

Figure 9:
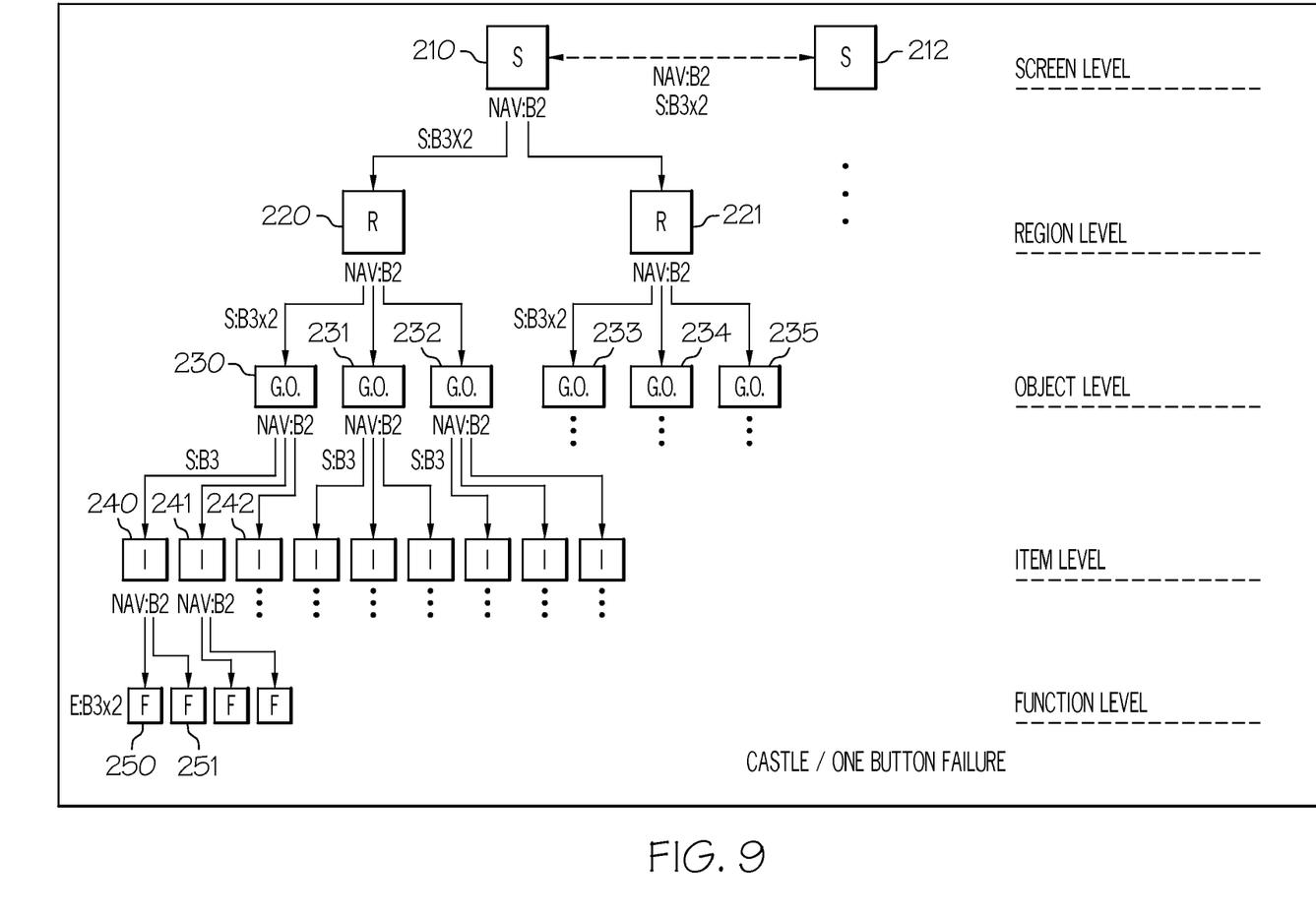
FIG. 9 is a block diagram illustrating an exemplary manipulation of an organization hierarchy of the system of FIG. 1 during a fifth reconfiguration mode.

FIG. 9 is a block diagram showing the operational hierarchy of the display device 140 and input device 130 during a fifth reconfiguration mode in which one button and the castle switch are inoperable. As in FIG. 4, numbered screens, regions, graphical objects, items, and functional choices correspond to similarly numbered screens, regions, graphical objects, items, and functional choices of FIG. 2. In this exemplary case, the castle switch 320 and the first button 330 have failed, and the remaining second and third buttons 340, 350 are operational.

A user initially sequentially navigates between screens 210, 212 using the second button switch 320, and selects a screen 210, 212 by double-clicking the third button 350. On the region level of the operational hierarchy, the user sequentially navigates between regions (e.g., between regions 220, 221) using the second button 340, and selects a region by double clicking the third button 350.

On the graphical object level of the operational hierarchy, the user sequentially navigates between graphical objects (e.g., between objects 230, 231, 232 or between objects 233, 234, 235) by pressing the second button 340 to sequentially move around the graphical objects. The user then selects a graphical object by double clicking the third button 350.

On the item level of the operational hierarchy, the user sequentially navigates between items (e.g., between items 240, 241, 242) using the second button 340, and an item is selected by clicking the third button 350. This should open up a dialog box with functional choices (e.g., functional choices 250, 251). The user may navigate between the functional choices with the second button 340, and execute the desired functional choice by double clicking the third button 350. Upon execution of the functional choice, the operational hierarchy defaults to the item level (e.g., items 240-242). In other embodiments, the operational hierarchy defaults to the screen, region, or graphical object level.

Figure 10:
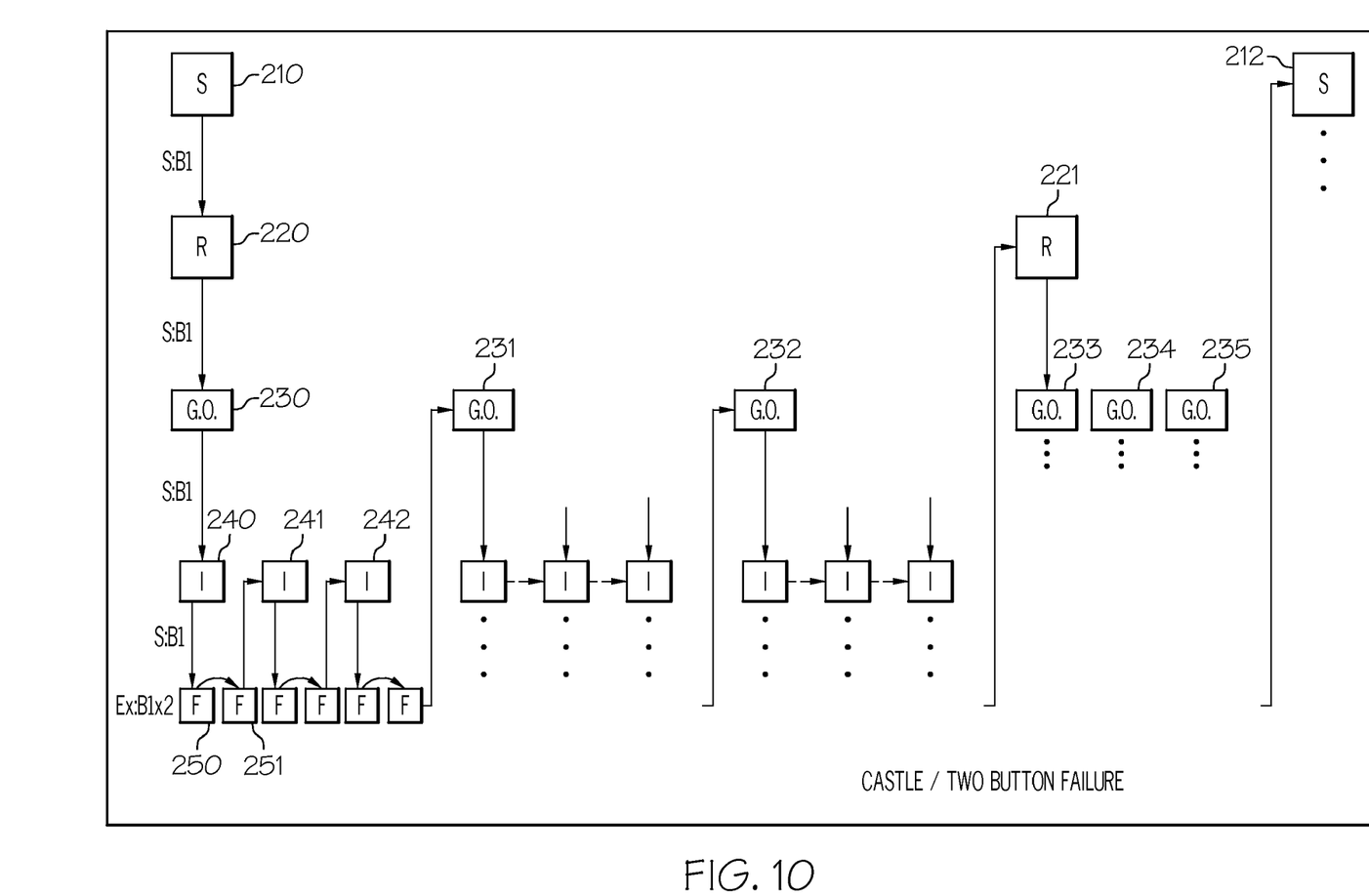
FIG. 10 is a block diagram illustrating an exemplary manipulation of an organization hierarchy of the system of FIG. 1 during a sixth reconfiguration mode.

FIG. 10 is a block diagram showing the operational hierarchy of the display device 140 and input device 130 during a sixth reconfiguration mode in which two buttons and the castle switch are inoperable. As in FIG. 4, numbered screens, regions, graphical objects, items, and functional choices correspond to similarly numbered screens, regions, graphical objects, items, and functional choices of FIG. 2. In this exemplary case, the second and third buttons 340, 350 and the castle switch 320 have failed, and only the first button 330 is operational.

A user initially sequentially navigates directly through the first screen 210, the upper region 220, the first graphical object 230, and the first item 240 to the functional choices 250, 251 with the first button 330. The user may execute a selected function choice (e.g., functional choice 250 or 251) by double clicking the first button 330. Alternatively, the user may continue to navigate through the operational hierarchy by toggling through the functional choices 250, 251. After navigating through the functional choices 250, 251 of the first item 240, the user navigates through the functional choices of the second item 241, and then the third item 242. After navigating through the functional choices of the first graphical object 230, the user navigates through the functional choices associated with the second graphical object 231 and the third graphical object 232 in the upper region 220. This process continues through the lower region 221 and subsequently through the regions, graphical objects, items, and functional choices of the second screen 212.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system, comprising:
an input device comprising first and second input members associated with a common housing and configured to be activated by a user, the input device configured to generate activation signals associated with activation of the first and second input members, each of the first and second input members being associated with an input function for visual display manipulation;
a processor coupled to the input device and configured to receive the activation signals;
a memory coupled to the processor, the memory comprising
a reconfiguration module configured to store the input functions assigned to the first and second input members and, upon execution of the processor, to reconfigure the input functions assigned to the input members when the first input member is inoperable,
the processor further configured to produce display signals based on the input functions associated with the activation signals; and
a display device coupled to the processor and configured to render a visual display based on the display signals from the processor representing the visual display manipulation at the input device.

2. The system of claim 1, wherein the first input member is a button and the second input member is a castle switch.

3. The system of claim 1, wherein the first input member is a castle switch and the second input member is a button.

4. The system of claim 1, wherein the reconfiguration module reconfigures the input function of the first input member to be associated with the second input member.

5. The system of claim 1, wherein the input device further includes a third input member, and wherein the reconfiguration module reconfigures the input function of the first input member to the third input member.

6. The system of claim 1, wherein the input device further includes third and fourth input members, the first input being a castle switch and the second, third, and fourth input members being buttons.

7. The system of claim 6, wherein the reconfiguration module is adapted to reconfigure the input functions when the second input member is additionally inoperable.

8. The system of claim 7, wherein the reconfiguration module is adapted to reconfigure the input functions when the third input member is additionally inoperable.

9. The system of claim 1, wherein the input device further includes third and fourth input members, the first, second and third input members being buttons and the fourth input member being a castle switch.

10. The system of claim 9, wherein the reconfiguration module is adapted to reconfigure the input functions when the second input member is additionally inoperable.

11. The system of claim 10, wherein the reconfiguration module is adapted to reconfigure the input functions when the third input member is additionally inoperable.

12. The system of claim 1, wherein the input functions are navigation functions within an operational hierarchy of at least two of a screen, a region, an object, an item, or a functional choice associated with the display device.

13. The system of claim 1, wherein the input functions are execution functions associated with the display device.

14. The system of claim 1, wherein the reconfiguration module is configured to automatically reconfigure the input functions upon the failure of the first input member.

15. A method for reconfiguring an input device having first and second input members associated with a common housing, comprising:
　receiving an indication that the first input member is inoperable;
　automatically remapping an input function associated with the first input member such that the input function is associated with second input member; and
　operating a display device with the second input member.

16. The method of claim 15, wherein the first input member is a button and the second input member is a castle switch.

17. The method of claim 15, wherein the first input member is a castle switch and the second input member is a button.

18. A system, comprising:
　an input device comprising first and second input members configured to be activated by a user, the input device configured to generate activation signals associated with activation of the first and second input members, each of the first and second input members being associated with an input function, the input function including a visual display manipulation;
　a processor coupled to the input device and configured to receive the activation signals;
　a memory coupled to the processor, the memory comprising
　　a reconfiguration module configured to store the input functions assigned to the first and second input members and, upon execution of the processor, to reconfigure the input functions assigned to the input members when the first input member is inoperable,
　the processor further configured to produce actuation signals based on the input functions associated with the activation signals; and
　an output device coupled to the processor and configured perform a function associated with the visual display manipulation based on the actuation signals from the processor.

19. The system of claim 18, wherein the output device is a display device with an operational hierarchy comprising screens, regions, objects, items, and functional choices, the input device configured to navigate within the operational hierarchy.

20. The system of claim 18, wherein the output device is an avionics display device.

* * * * *